US011869333B2

(12) United States Patent
Kelsch et al.

(10) Patent No.: US 11,869,333 B2
(45) Date of Patent: *Jan. 9, 2024

(54) MERCHANDISE HANDLING ALERT APPARATUS

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); William Claude Chazotte, Indian Rocks Beach, FL (US); John N. Figh, Jr., Oldsmar, FL (US); Michael P. Mitchell, Pinellas Park, FL (US)

(73) Assignee: Vanguard Products Group, Inc., Oldsmar, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/120,607

(22) Filed: Mar. 13, 2023

(65) Prior Publication Data

US 2023/0274630 A1 Aug. 31, 2023

Related U.S. Application Data

(63) Continuation of application No. 17/502,803, filed on Oct. 15, 2021, now Pat. No. 11,605,285.

(Continued)

(51) Int. Cl.

*G08B 21/22* (2006.01)
*G08B 3/10* (2006.01)
*G08B 5/38* (2006.01)
*G08B 25/01* (2006.01)
*G08B 7/06* (2006.01)
*G08B 13/14* (2006.01)

(52) U.S. Cl.

CPC ............... *G08B 21/22* (2013.01); *G08B 3/10* (2013.01); *G08B 5/38* (2013.01); *G08B 7/06* (2013.01); *G08B 13/1436* (2013.01); *G08B 25/016* (2013.01)

(58) Field of Classification Search

CPC ...................................................... G08B 21/22

See application file for complete search history.

(56) References Cited

U.S. PATENT DOCUMENTS 7,098,792 B1 * 8/2006 Ahlf ....................... G08B 21/24 340/568.1
7,990,270 B2 * 8/2011 Mostov .................. G08B 25/10 340/568.1

(Continued)

*Primary Examiner* — Travis R Hunnings

(74) *Attorney, Agent, or Firm* — Andriy Lytvyn; Hill Ward Henderson, P.A.

(57) ABSTRACT

A handling alert apparatus configured to detect a predefined event and output an alert responsive to detecting the predefined event. The handling alert apparatus includes a housing connected to an article of merchandise. The handling alert apparatus includes a handling sensor configured to detect when a customer handles the article of merchandise. Responsive to detecting handling of the article of merchandise, the housing outputs a visual, audible, or wireless notification alert. The alert remains active until an authorized user prepares the article of merchandise for subsequent customer interaction and deactivates the alert by using a wireless controller or manually operating a designated deactivation button or switch.

20 Claims, 6 Drawing Sheets

Related U.S. Application Data

(60) Provisional application No. 63/110,728, filed on Nov. 6, 2020.

(56) References Cited

U.S. PATENT DOCUMENTS

| | | | | |
|---|---|---|---|---|
| 8,907,793 | B2 * | 12/2014 | Mostov | G06Q 10/0833 |
| | | | | 340/568.1 |
| 11,605,285 | B1 * | 3/2023 | Kelsch | G08B 3/10 |
| 2010/0214413 | A1 * | 8/2010 | Lin | G07G 3/003 |
| | | | | 348/150 |
| 2011/0169635 | A1 * | 7/2011 | Johnson | G08B 21/24 |
| | | | | 600/300 |
| 2015/0293563 | A1 * | 10/2015 | Wharrad | G06F 1/1632 |
| | | | | 726/20 |
| 2017/0043714 | A1 * | 2/2017 | Lewis-Cheeks | G08B 21/22 |
| 2017/0331571 | A1 * | 11/2017 | Cole | H04W 56/003 |
| 2018/0200022 | A1 * | 7/2018 | Schonfeld | A61L 2/24 |
| 2020/0134410 | A1 * | 4/2020 | Morgan-Rottman | G08B 3/10 |

* cited by examiner

MERCHANDISE HANDLING ALERT APPARATUS

PRIORITY CLAIM

This non-provisional application is a continuation of and claims priority to U.S. non-provisional application Ser. No. 17/502,803 filed on Oct. 15, 2021, which claims priority to U.S. provisional application No. 63/110,728 filed on Nov. 6, 2020.

BACKGROUND OF THE INVENTION

1. Field of the Invention

This invention relates to merchandise handling alert apparatus. More specifically, it relates to a handling alert apparatus having an integrated alert configured to be activated responsive to handling of merchandise.

2. Brief Description of the Related Art

Retailers often prefer to demonstrate their merchandise to customers by allowing the customers to touch, inspect, and interact with the products at a display counter. In busy retail locations, hundreds or even thousands of people handle the same merchandise items daily. Such mass handling of merchandise creates a serious risk for spread of germs and viruses from one customer to the next. Although many retailers implement rigorous disinfection protocols, it is nearly impossible to assure that every merchandise item is disinfected after every customer interaction. Thus, what is needed is a handling alert apparatus configured to output an alert after each handling of the merchandise, notifying store personnel that the merchandise has been handled by a customer and, therefore, must be disinfected or otherwise prepared for subsequent customer interaction.

SUMMARY OF THE INVENTION

Heretofore unresolved need for a handling alert apparatus is met with a novel and nonobvious invention. In an embodiment, the handling alert apparatus includes a housing configured to be connected to the item of merchandise. The housing may belong to a handling module which is configured to be affixed to merchandise, or the housing may belong to a pedestal configured to support merchandise thereon.

The housing contains a processor. The housing further contains a handling sensor in electrical communication with the processor. The handling sensor is configured to detect that the item of merchandise has been handled—for example, by detecting movement or vibration of the item of merchandise or by detecting separation of the item of merchandise from the pedestal. The handling sensor may be an accelerometer, a proximity sensor, a motion sensor, a microphone, a camera, a magnetic field sensor, a light detector, or an electronic component configured to detect interruption of electric current flow. In response to detecting that the item of merchandise has been handled and/or positioned back onto the pedestal after being handled, the handling sensor is configured to transmit a first electrical signal to the processor.

In addition to the processor and the handling sensor, the housing also contains an electronic output device—for example, a light emitting diode (LED), a speaker, a piezoelectric device, a wireless signal transmitter, etc. The electronic output device is communicatively coupled to the processor, such that the processor is configured to trigger the electronic output device to output a visual alert or an audible alert when the handling sensor detects that the item of merchandise has been handled. The visual alert may involve the LED being set to a predefined color or flashing in a predefined sequence or a sound emitting device outputting a predefined sound sequence. In this manner, the visual alert or the audible alert notifies retail store personnel that the item of merchandise has been handled and needs to be disinfected, inspected, or requires another action prior to subsequent customer interaction.

The housing may further contain an input receiver device—for example, an optical sensor, a radio frequency sensor, an inductive coil, a magnetic field sensor, a magnetically actuated switch, a push button, a mechanical switch, etc. The input receiver device is configured to receive a predefined input indicating that the item of merchandise has been prepares the article of merchandise for subsequent customer interaction after being handled by the previous customer. Depending on the type of the input receiver device being used, examples of the predefined input may include an optical signal, a radio frequency signal, a magnetic field, manual operation of the push button, or manual operation of the mechanical switch. In an embodiment, the predefined input may be transmitted by a dedicated deactivation fob external to the housing.

When the input receiver device receives the predefined input, the input receiver device transmits a corresponding electrical signal to the processor. Upon receipt of this electrical signal, the processor causes the electronic output device to cease outputting the visual alert and/or the audible alert. At this point, the item of merchandise has been prepared for subsequent consumer interaction, the alert has been turned off, and the item of merchandise is ready for subsequent customer handling.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized, and structural changes may be made without departing from the scope of the invention.

Figure 1A:
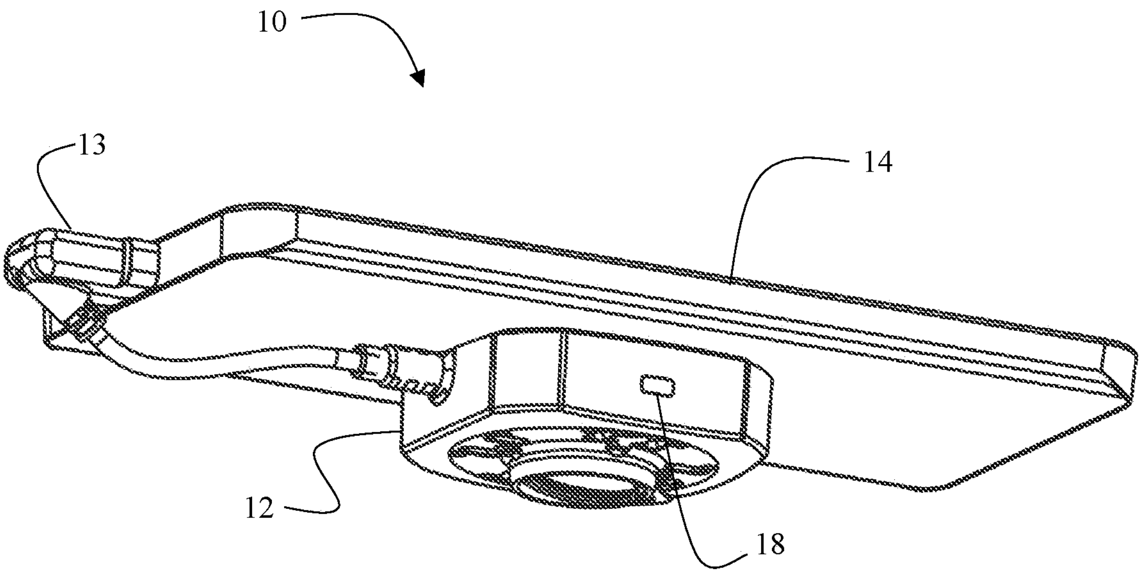
FIG. 1A is a perspective view showing a handling module attached to the rear surface of an item of merchandise.
Figure 1B:
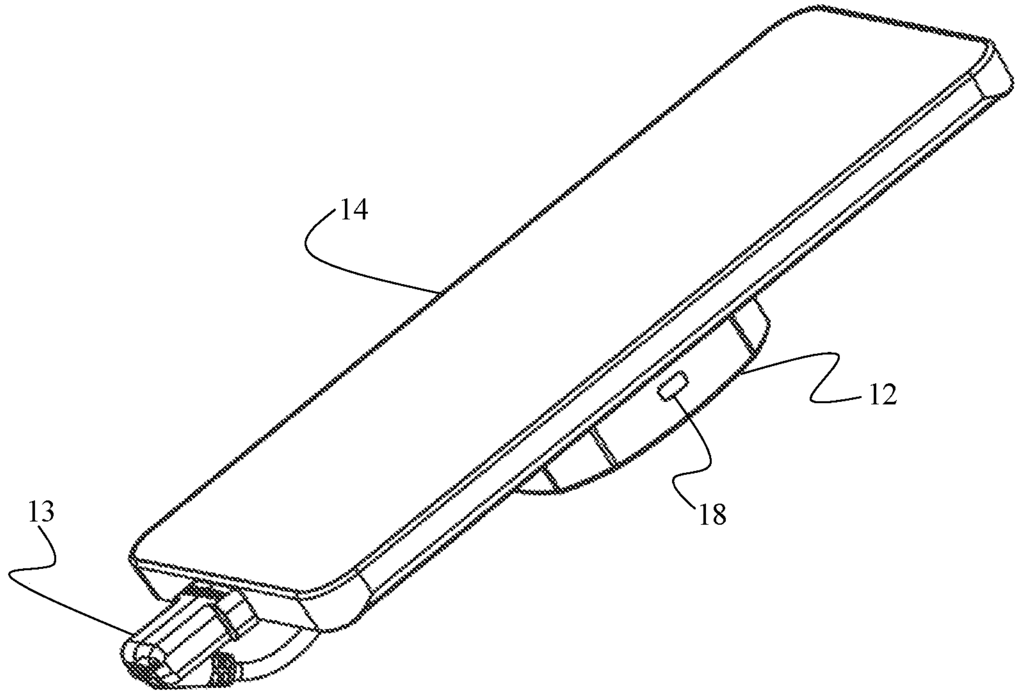
FIG. 1B is a perspective view depicting the front surface of the item of merchandise and the handling module attached thereto.

Referring to FIGS. 1A and 1B, an embodiment of the invention pertains to a handling alert apparatus 10 having a handling module 12. Handling module 12 is configured to be attached to an object that is configured to be handled by a human. In the exemplary embodiment described herein, the object is an item of merchandise 14—for example, an electronic gadget. However, handling alert apparatus 10 is not limited to retail setting and may be used for a variety of applications, including handling of door handles, shopping carts, medical equipment, exercise equipment, and other items that are commonly touched and handled by multiple successive users.

In the embodiment depicted in FIGS. 1A and 1B, handling module 12 is adapted to be attached to a back surface of merchandise 14 using an adhesive layer. Alternatively, handling module 12 may be attached to item of merchandise 14 using mechanical brackets or any other means known in the art. In an embodiment, handling module 18 may be electrically connected to item of merchandise 14 via a power connector 13. Power connector 13 may be used to provide power to item of merchandise 14 and may also be used to enable item of merchandise 14 to communicate security events and other information to handling module 12.

Figure 2A:
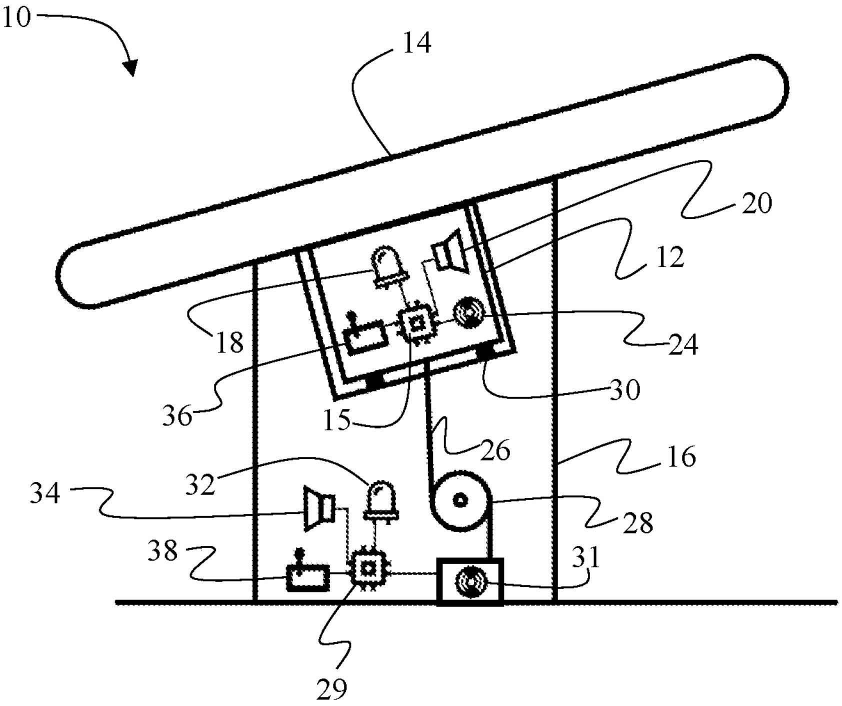
FIG. 2A is a schematic side view depicting the item of merchandise at rest on a pedestal. The audio and visual output devices are deactivated.
Figure 2B:
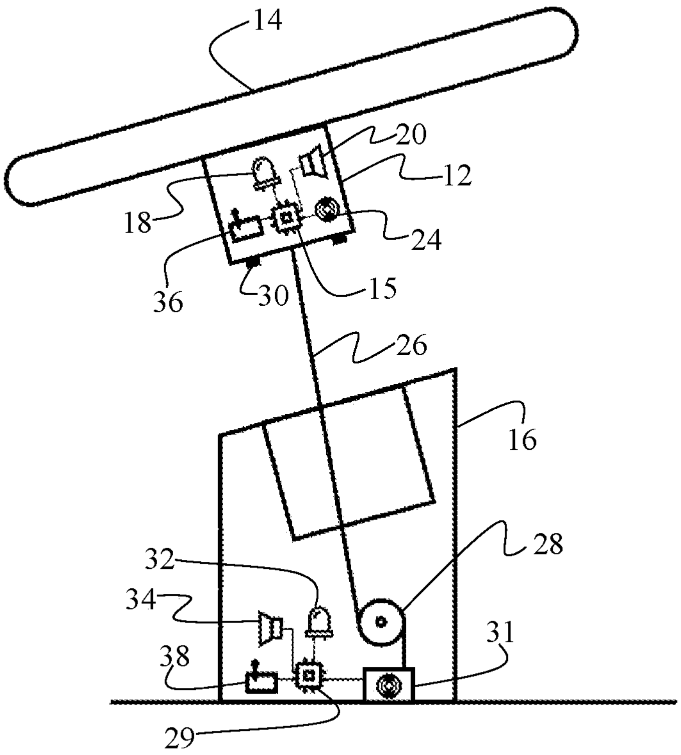
FIG. 2B is a schematic side view depicting the item of merchandise in an active interaction position in which the item of merchandise is lifted from the pedestal.

FIGS. 2A and 2B depict that handling module 12 has a processor 15. Processor 15 may be configured to perform a plurality of functions pertaining to security of article merchandise 14. For example, processor 15 may be configured to communicate with electronic components housed within handling module 12 to detect theft attempts. For example, handling module 12 may contain electronic components configured to detect detachment of handling module 12 from merchandise 14 or disconnection or severance of a tether cable 26 connecting handling module 12 to a display counter or a pedestal 16. Processor 15 may be configured to trigger an alarm upon detection of a security event.

FIGS. 2A and 2B further depict that handling module 12 has an integrated light source, for example a light emitting diode (LED) 18. LED 18 is communicatively coupled to processor 15, such that processor 15 can trigger LED 18 to output visual alerts. In an embodiment, processor 15 can change the power state of LED 18, its color, brightness, and/or flashing pattern. In this manner, LED 18 can be used to output various preconfigured alerts to store personnel.

Handling module 12 can further include a sound emitting device 20 electrically coupled to processor 15. Sound emitting device can be a piezoelectric element or a speaker. Sound emitting device 20 can be configured to output audible alerts when a predefined event occurs. Furthermore, handling module 12 can be equipped with a wireless transmitter, for example an optical (infrared) transmitter or a radio frequency transmitter to wirelessly send alerts to a central controller and/or electronic devices of individual store personnel members.

In an embodiment, handling module 12 is equipped with a handling sensor 24. As used herein the term "handling sensor" refers to an electronic device used to detect that item of merchandise 14 has been handled by a customer. The term "handled" includes any type of physical contact with item of merchandise 14—for example, when a customer touches, grasps, lifts, or moves item of merchandise 14 relative its initial at-rest position.

In an embodiment, handling sensor 24 can be an accelerometer. The accelerometer can be configured to detect when item of merchandise 14 is at rest (e.g., motionless), as depicted in FIG. 2A, and when item of merchandise 14 is touched, grasped, lifted, or otherwise moved by a customer, as depicted in FIG. 2B. Instead, or in addition to an accelerometer, handling module 12 can be equipped with other types of handling sensors 24 including a proximity sensor, a motion sensor, a light detector, an imaging device, a microphone, a magnetic field sensor, or any other electronic device capable of detecting that item of merchandise 14 has been handled by a customer, for example such as when a customer removes item of merchandise 14 from its at-rest position depicted in FIG. 2A into an interaction position depicted in FIG. 2B.

FIGS. 2A-2E further depict that handling alert apparatus 10 may have a pedestal 16 configured to removably support handling module 12. When pedestal 16 is present, one or more handling sensors 31 may be integrated into pedestal 16 and used to detect removal of handling module 12 from pedestal 16. Furthermore, as depicted in FIGS. 2A-2E handling module 12 can be connected to pedestal 16 via a tether cable 26. In an embodiment the tether cable can be wound under tension on a reel 28. In this embodiment, cable 26 and/or the reel 28 can be equipped with a handling sensor configured to detect when article of merchandise 14 has been handled by detecting tension in cable 26 or rotation of reel 28.

FIGS. 2A-2E further depict that handling module 12 and pedestal 16 may be equipped with complementary electrical contacts 30. These electrical contacts 30 enable handling module 12 to receive power from pedestal 16 when handling module 12 is at rest on pedestal 16 and their electrical contacts 30 engage one another. In this embodiment, handling sensor 24/31 may be an electrical component that can be used to detect interruption of the electrical engagement between charging contacts 30.

As explained above, an aspect of the invention is the ability for handling module 12 and/or pedestal 16 to detect a customer touching, lifting, or otherwise handling item of merchandise 14. A person of ordinary skill in the art will understand that other means of accomplishing this objective can be implemented without departing from the principles of the invention disclosed herein. Therefore, such other means of detecting removal of handling module 12 fall within the scope of the invention.

Next, FIGS. 2A-2E depict that, in embodiments involving pedestal 16, pedestal 16 may be equipped with its own processor 29, handling sensor 31, LED 32, and/or sound emitting device 34. In some embodiments, it may be advantageous to equip both handling module 12 and pedestal 16 with such means of outputting alerts to achieve redundancy. In other embodiments, it may be beneficial to only equip handling module 12 or pedestal 16 with the alert generating components to save cost and reduce complexity. In either case, at least one component of the security system is equipped with a device for alerting the store personnel when handling module 12 has been removed from pedestal 16 or merchandise 14 has been otherwise handled by a customer.

As explained above, handling module 12, pedestal 16, or both may be equipped with one or more handling sensors 24/31 configured to detect removal of handling module 12 from pedestal 16, or other handling of item of merchandise 14. When item of merchandise 14 is handled, as depicted in FIG. 2B, handling sensor 24/31 detects this event. It may be preferable to delay activation of audible and/or visual alert until the customer concludes interaction with item of merchandise 14. For this reason, processor 15 may be configured to trigger the handling alert by activating LED 18/32 and/or sound emitting devices 20/34 after handling alert apparatus 10 detects that item of merchandise 14 has been returned to its at-rest position, as depicted in FIG. 2C.

Figure 2C:
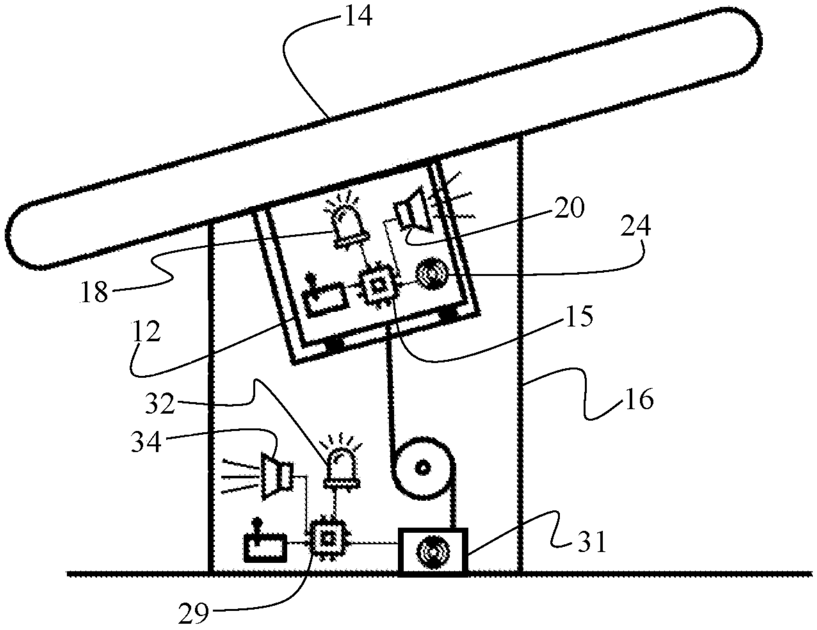
FIG. 2C is a schematic side view depicting the item of merchandise returned to an at-rest position after being handled by a customer. The audio and visual output alerts are activated.

FIG. 2C depicts that the alert remains active—for example, LED 18/32 stays lit or flashes in a predetermined pattern and/or sound-emitting device 20/34 produces an audible alert—when merchandise 14 is returned to its at-rest position. The audible and/or visual alert remains activated until an authorized personnel member disinfects or otherwise prepares the item of merchandise 14 for subsequent consumer interaction and then, deactivates the alert. In this manner, the alert is intended to provide two layers of safety: (1) the alert remains active to inform store personnel that item of merchandise 14 has been handled by a customer and must be disinfected or otherwise prepared for subsequent customer interaction, and (2) subsequent customers will be deterred from handling item of merchandise 14 while an alert is being emitted. In this manner, handling alert apparatus 10 increases the likelihood that item of merchandise 14 will be prepared for subsequent customer interaction between every customer handling.

Figure 2D:
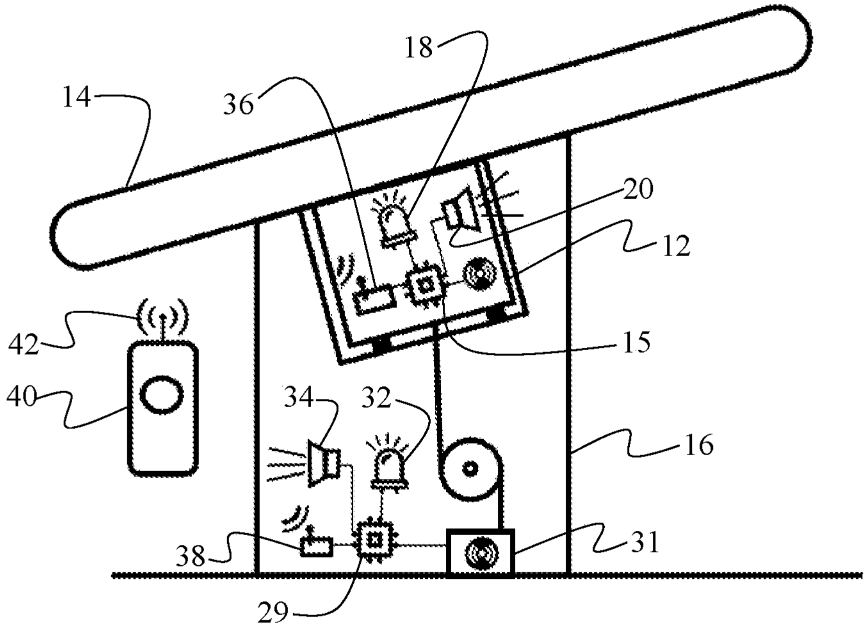
FIG. 2D is a schematic side view depicting a deactivation fob transmitting a deactivation signal to a receiver disposed within the handling module and/or the pedestal.

FIG. 2D depicts that handling module 12 contains an input receiver device 36. Input receiver device 36 may be electrically coupled to processor 15. Alternatively, or in addition to receiver device 36, pedestal 16 may contain its own input receiver device 38. Input receiver device 36/38 can be an optical sensor, a radio frequency sensor, an inductive coil, a magnetic field sensor, a magnetically actuated switch, a push button, a mechanical switch, or any other input device known in the art that can be configured to transmit a predefined electrical signal to processor 15 in response to receiving a predefined input.

FIG. 2D depicts a fob 40, which may be used to provide a predefined input to input receiver device 36/38 to deactivate the visual and/or audible handling alert. In embodiments in which input receiver device 36/38 is configured to receive a wireless signal, fob 40 may be equipped with a transmitter 42. Authorized personnel members can use fob 40 to trigger transmitter 42 to transmit a deactivation input signal to receiver device 36/38. The deactivation signal may be transmitted wirelessly—for example as an optical signal (e.g., infrared signal), a radio frequency signal, a magnetic field, etc. Alternatively, in the embodiments in which input receiver device 36/38 is configured to be operated mechanically, the visual and/or audible alert can be deactivated using a physical button, switch, magnetic sensor, or the like.

Figure 2E:
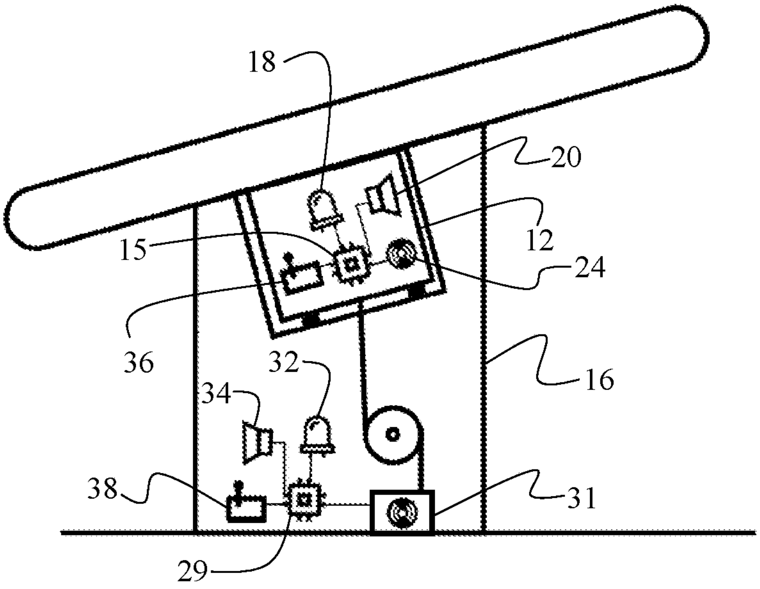
FIG. 2E is a schematic side view depicting the handling alert apparatus returned to its default state with audible and visual alerts being deactivated. The article of merchandise is available for the next customer interaction.

After the input receiver device 36/38 receives a predefined input, it transmits an electronic signal to processor 15/29. In response to receiving this signal, processor 15/29 deactivates LED 18/32 and/or sound-emitting device 20/34, as depicted in FIG. 2E. At this point, item of merchandise 14 has been prepared for subsequent customer interaction, the audio and/or visual alerts of handling notification alert apparatus 10 have been deactivated, and item of merchandise 14 is ready for a subsequent customer interaction.

Figure 3A:
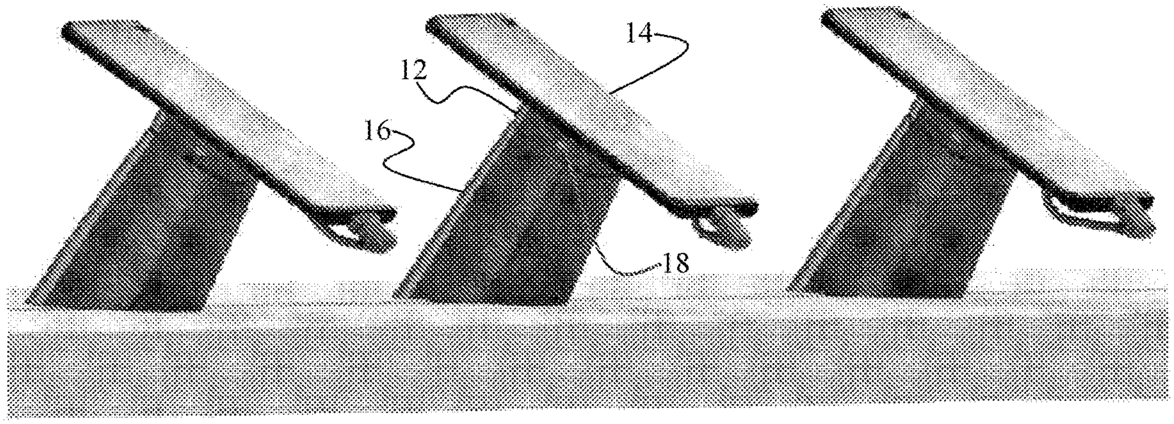
FIG. 3A is a perspective view depicting the item of merchandise at rest on a pedestal. The visual output device is deactivated.
Figure 3B:
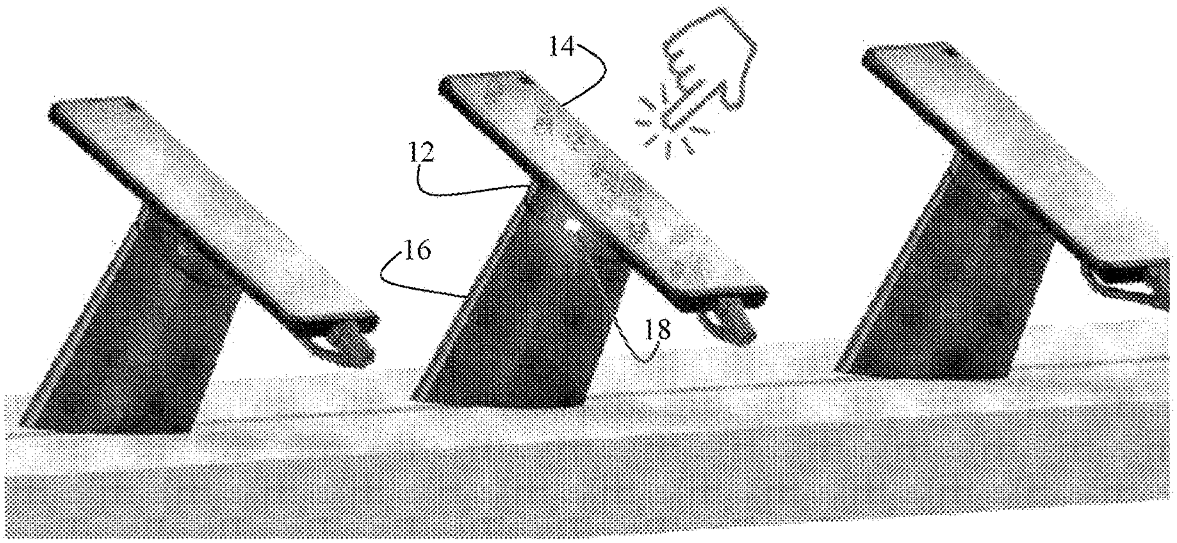
FIG. 3B is a perspective view depicting the item of merchandise being handled—i.e., touched—by a customer. The visual output device is activated to output a visual alert.
Figure 3C:
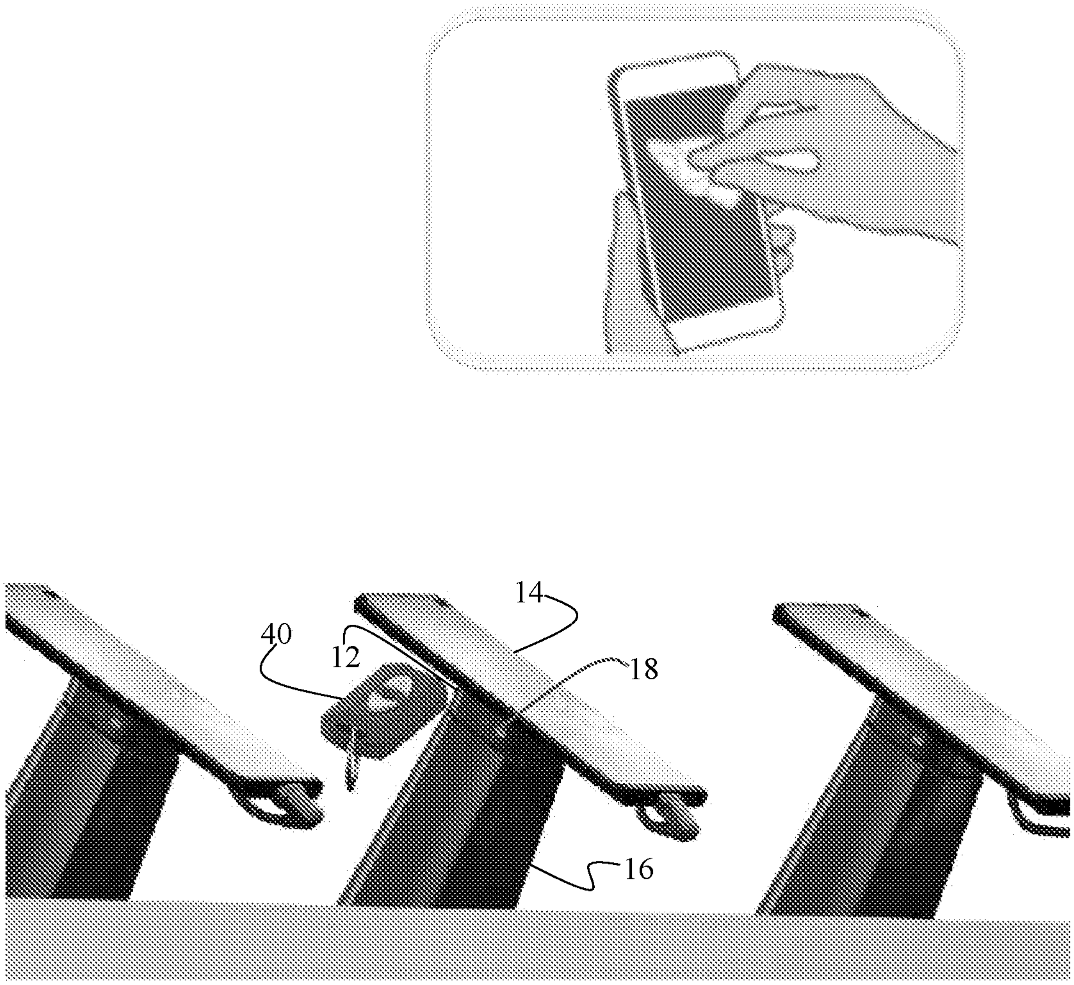
FIG. 3C is a perspective view depicting the item of merchandise after customer interaction. A retail personnel member prepares the item of merchandise for subsequent customer interaction and deactivates the alarm using a deactivation fob.

FIGS. 3A-3C depict an exemplary embodiment of the invention in which item of merchandise 14 is an electronic gadget. FIG. 3A depicts a handling module 12 having an integrated LED 18. As described above, handling module 12 houses a processor 15 and a handling sensor 24 in electrical communication processor 15. Handling sensor 24 may configured to detect a vibration or any type of movement of article of merchandise 14, which is indicative of article of merchandise 14 being touched or otherwise handled. Alternatively, handling sensor 24 may be configured to detect when handling module 12 has been lifted from pedestal 16, using one of the methods described above.

When handling sensor 24 detects that article of merchandise 14 has been handled, it transmits a corresponding electrical signal to processor 15. In response to receiving the electrical signal, processor 15 activates LED 18 to output a visual alert, as depicted in FIG. 3B. The visual alert notifies the retail store personnel that merchandise 14 has been handled by a customer and, therefore, must be disinfected or otherwise prepared for subsequent customer interaction.

FIG. 3C depicts article of merchandise 14 being otherwise prepared for subsequent customer interaction by an authorized store personnel member. After merchandise 14 has been prepared for subsequent customer interaction, fob 40 can be used to transmit a deactivation signal to input receiver device 36 housed within handling module 12. When input receiver device 36 detects the deactivation signal, it transmits a corresponding electrical signal to processor 15, in response to which processor 15 deactivates LED 18. At this point, the handling alert apparatus 10 returns to its default state, and item of merchandise 14 is ready for subsequent customer interaction.

In the embodiment in which the article of merchandise 14 has built-in electronics—for example, a touchscreen, physical buttons, a camera, a microphone, an accelerometer, a gyroscope, etc.—these built-in electronics can be used to determine that a customer has handled the article of merchandise. When the article of merchandise 14 detects that it has been handled by a customer, it can send a corresponding signal, either through a wired connection via cable 13 or wirelessly, to handling module 12, pedestal 16, or a central controller. Upon receipt of this signal, handling module 12, pedestal 16, or the central controller will output a visual and/or audible alert indicating that the merchandise has been handled and must be prepared for subsequent customer interaction. In accordance with the deactivation procedure described above, after preparing item of merchandise 14 for subsequent customer interaction, an authorized store personnel member will deactivate the alert, indicating that merchandise 14 has been cleaned and is ready for subsequent customer interaction. In an embodiment, a software application may be installed on item of merchandise 14 configured to detect handling events and output an alert using the screen of the device, the speak, and/or built in LEDs.

The above description pertains to a use case in which the handling alert apparatus is deployed in a retail environment and is used to indicate when merchandise needs to be prepared for subsequent customer interaction. The present invention, however, is not limited to this use case. A person of ordinary skill in the art will appreciate that handling alert apparatus 10 may be used in other applications to indicate a wide array of predefined events outside of merchandise needing to be prepared for subsequent customer interaction.

Handling module 12 can be attached to any object and can be configured to generate an alert—such as a visual and/or audible alarm—when handling module 12 detects that the object has been handled. For example, handling module 14 can be attached to a door and can be configured to activate the alert in response to handling module 12 detecting the movement of the door, which would prompt disinfection of the door handle. Other use cases also fall within the scope of the invention.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A handling alert apparatus for an object configured to be handled, comprising:

a housing configured to be connected to the object;

a handling sensor disposed within the housing, the handling sensor being in electrical communication with a processor, wherein the handling sensor is configured to detect a handling event in response to handling of the object, and wherein the handling sensor is configured to transmit a first electrical signal to the processor in response to detecting the handling event; and an electronic output device in electrical communication with the processor, wherein responsive to receiving the first electrical signal from the handling sensor, the processor is configured to trigger the electronic output device to output a visual alert or an audible alert, wherein the visual alert or the audible alert is outputted subsequent to the object being returned to a designated at-rest position.

2. The handling alert apparatus of claim 1, further comprising an input receiver device disposed within the housing, wherein responsive to the input receiver device receiving a predefined input a second electrical signal is transmitted to the processor, wherein upon receipt of the second electrical signal the processor causes the electronic output device to cease outputting the visual alert or the audible alert, wherein the input receiver device is selected from a group consisting of an optical sensor, a radio frequency sensor, an inductive coil, a magnetic field sensor, a magnetically actuated switch, a push button, and a mechanical switch.

3. The handling alert apparatus of claim 2, wherein the predefined input is an optical signal, a radio frequency signal, a magnetic field, or a manual operation of the push button or the mechanical switch.

4. The handling alert apparatus of claim 2, wherein the predefined input is received from a deactivation fob external to the housing.

5. The handling alert apparatus according to claim 1, wherein the visual alert or the audible alert notifies a user that the object has been handled and needs to be disinfected.

6. The handling alert apparatus according to claim 1, wherein the handling sensor is selected from a group consisting of an accelerometer, a proximity sensor, a motion sensor, a microphone, a photosensor, a magnetic field sensor, a light detector, and an electronic component configured to detect interruption of power transfer.

7. The handling alert apparatus according to claim 1, wherein the housing is selected from a group consisting of a handling module configured to attach directly to the object and a pedestal configured to support the article of merchandise thereon.

8. The handling alert apparatus according to claim 4, wherein the handling sensor is configured to transmit the first electrical signal responsive to detecting removal of the housing from a pedestal or subsequent placement of the housing onto the pedestal.

9. The handling alert apparatus according to claim 1, wherein the handling sensor is configured transmit the first electrical signal responsive to detecting movement or vibration of the housing.

10. The handling alert apparatus according to claim 1, wherein the electronic output device is selected from a group consisting of a light emitting diode, a speaker, and a piezoelectric element.

11. The handling alert apparatus according to claim 1, wherein the visual alert involves a light emitting diode being set to a predefined color or flashing in a predefined sequence.

12. A handling alert apparatus for an object configured to be handled, comprising:

a handling module configured to be attached to the object;

a pedestal configured to support the handling module, wherein the object has an at-rest position when the object is resting on the pedestal and a lifted position when the object is removed from the pedestal;

a handling detection mechanism configured to detect a handling: event corresponding to the object being transitioned between the at-rest position and the lifted position, and wherein handling detection mechanism is configured to transmit a first electrical signal to a processor in response to detecting the handling event; and an electronic output device in electrical communication with the processor, wherein responsive to receiving the first electrical signal from the handling detection mechanism, the processor is configured to cause the electronic output device to output a visual alert or an audible alert, wherein the visual alert or the audible alert is outputted in response to the object being returned to the at-rest position.

13. The handling alert apparatus according to claim 12, wherein the visual alert or the audible alert notifies a user that the object has been handled and needs to be disinfected.

14. The handling alert apparatus according to claim 12, wherein the handling detection mechanism is selected from a group consisting of an accelerometer, a proximity sensor, a motion sensor, a microphone, a camera, a magnetic field sensor, a light detector, complementary electrical contacts disposed on the pedestal and the handling module, and a tether reel configured to detect extension of a tether connecting the handling module to the pedestal.

15. The handling alert apparatus according to claim 12, wherein the first electrical signal is transmitted responsive to detecting removal of the handling module from the pedestal or subsequent placement of the handling module onto the pedestal.

16. The handling alert apparatus according to claim 12, wherein the handling detection mechanism is configured transmit the first electrical signal responsive to detecting movement or vibration of the handling module.

17. The handling alert apparatus according to claim 12, wherein the electronic output device is selected from a group consisting of a light emitting diode, a speaker, and a piezoelectric element.

18. The handling alert apparatus according to claim 12, wherein the visual alert involves a light emitting diode being set to a predefined color or flashing in a predefined sequence.

19. The handling alert apparatus of claim 12, further comprising an input receiver device disposed within the housing, wherein responsive to the input receiver device receiving a predefined input, a second electrical signal is transmitted to the processor, wherein upon receipt of the second electrical signal the processor causes the electronic output device to cease outputting the visual alert or the audible alert, wherein the input receiver device is selected from the group consisting of an optical sensor, a radio frequency sensor, an inductive coil, a magnetic field sensor, a magnetically actuated switch, a push button, and a mechanical switch.

20. The handling alert apparatus of claim 19, wherein the predefined input is an optical signal, a radio frequency signal, a magnetic field, or a manual operation of the push button or the mechanical switch.

* * * * *